S. E. Totten,
Can Opener,

N° 61,484. Patented Jan. 22, 1867.

Witnesses: Inventor:

United States Patent Office.

SINEUS E. TOTTEN, OF BROOKLYN, NEW YORK, ASSIGNOR TO HIMSELF AND C. L. TOPLIFF.

*Letters Patent No. 61,484, dated January 22, 1867.*

IMPROVEMENT IN CAN OPENER.

*The Schedule referred to in these Letters Patent and making part of the same.*

TO ALL WHOM IT MAY CONCERN:

Be it known that I, S. E. TOTTEN, of Brooklyn, in the county of Kings, and State of New York, have invented a new and improved Can Opener; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
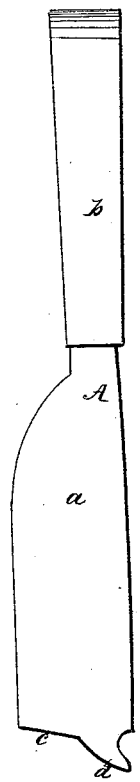
Figure 1 represents a side elevation of this invention.
Figure 2:
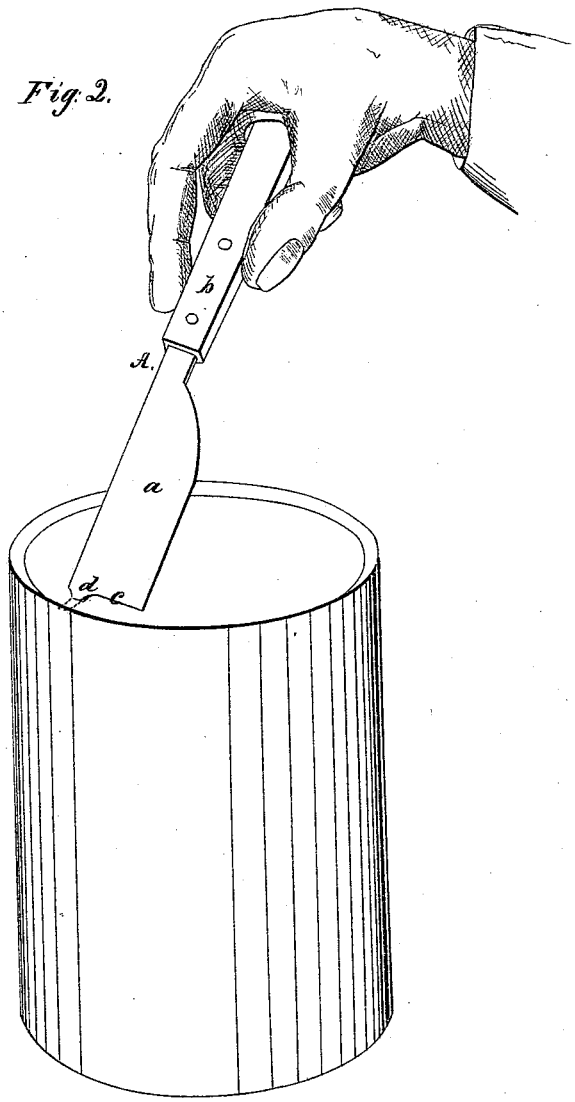
Figure 2 is a perspective view of the same showing its operation.

This invention relates to a tool or implement intended for opening sardine or other tin cans. It consists of a knife-like blade provided with a flat inclined sharp-edged end, from which projects a pointed tooth in such a manner that if said tooth is pushed through the cover of the can to be opened, it forms a fulcrum on which the tool can be turned, and its cutting edge forced through the tin, and the operation of cutting out the cover of a tin can, or of cutting a hole in the same sufficiently large to get at the contents thereof, can be performed with the greatest ease and facility.

A represents my tool, which consists of a blade, $a$, secured in a suitable handle, $b$. The blade $a$ is similar to a knife-blade with a flat inclined end, $c$, which forms a sharp cutting edge, and from which projects a tooth, $d$. This tooth is provided with a sharp point, and if it is pushed through the cover of a tin can it forms a fulcrum on which the blade turns, and the cutting edge thereof can be readily forced through the tin. By repeating this operation a hole can be cut out large enough to get access to the contents of the can, and the operation of opening a can can be performed with little trouble or exertion in a short time, and by any person of ordinary mechanical skill. My tool can be made cheap, and it can also be used as an ordinary knife in cutting vegetables, or for other purposes.

Having thus described my invention, I claim as new, and desire to secure by Letters Patent—

A tool A, provided with a sharp-edged end $c$, from which projects a pointed tooth $d$, substantially as and for the purpose described.

SINEUS E. TOTTEN.

Witnesses:
JOHN DIKEMAN,
LYDIA TOTTEN.